J. BOWMAN.

Corn Sheller.

No. 109,289.

Patented Nov. 15, 1870.

Witnesses:
W. Burris
H. M. Slade

Inventor:
John Bowman
By Atty. G. B. Fowler

United States Patent Office.

JOHN BOWMAN, OF PRINCEVILLE, ILLINOIS.

Letters Patent No. 109,289, dated November 15, 1870.

IMPROVEMENT IN COMBINED THRASHING-MACHINES AND CORN-SHELLERS.

The Schedule referred to in these Letters Patent and making part of the same.

*To all whom it may concern:*

Be it known that I, JOHN BOWMAN, of Princeville, in the county of Peoria and in State of Illinois, have invented a Combined Thrasher (for corn, wheat, and oats) and Corn-Sheller; and I hereby declare that the following is a full, clear, and exact description thereof, reference being had to the annexed drawing making a part of this specification, in which like letters of reference refer to like parts, and in which—

Figure 1:
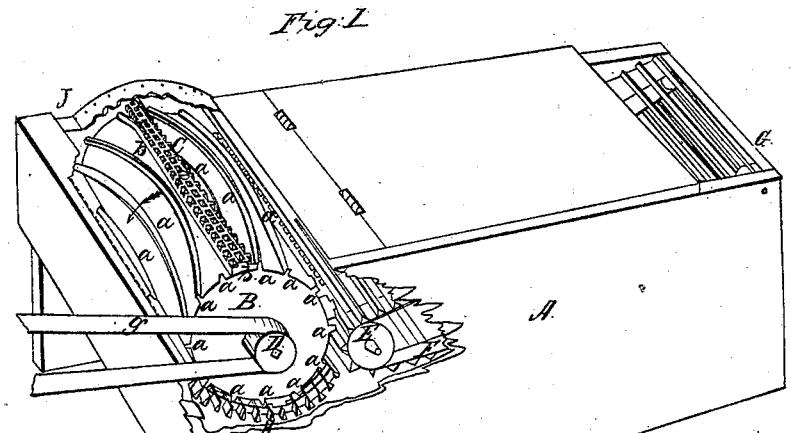

Figure 1 represents a perspective view of the machine.

Figure 2:
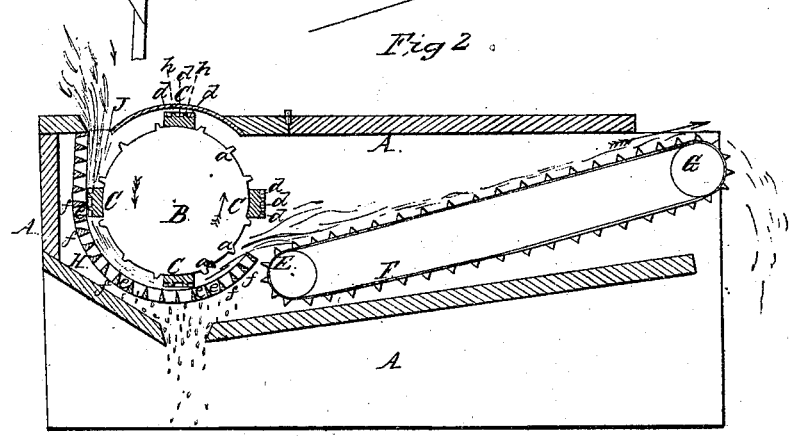

Figure 2, a sectional elevation.

Figure 3:
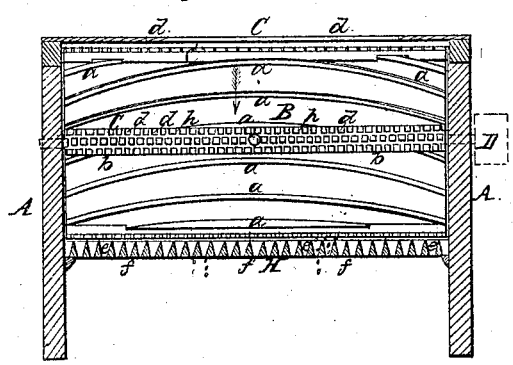

Figure 3, transverse elevation of the cylinder, ribs, and removable bar.

Like letters in the figures of the drawing indicate like parts.

This invention relates to a combination of movable sheller-bars, by which either small grain and corn are thrashed by merely changing the parts.

A represents the inclosing case, which is an oblong box with close top and sides.

B is an ordinary corn-sheller cylinder, with its curved ribs *a a* running from end to end, and about twenty inches in diameter and about thirty inches in length, and set at one end of the box, the feeding-place J being between the cylinder and the end of the box.

The ends of the cylinder have bearings in the sides of the former, and a pulley D, on its axle, for a band.

The cylinder is used with the curved ribs in conjunction with the concave sheller H, when thrashing or shelling corn; but when using machines for small grain, the horizontal reticulated bars C are fastened onto the circumference of the cylinder at equal distances over the small ribs *a a*.

C represents the bars just mentioned, which have depressions, *d*, all over their surfaces, divided by the ribs *h*, making a reticulated surface for shelling the grain. The depth of the depressions are not material, but they may be made about one-fourth of an inch square, and the bar of such a thickness as to revolve with the cylinder at about one-fourth to three-eighths of an inch distance from the concave sheller H beneath.

The bars are fastened to the surface of the cylinder over the ribs which help to retain them, by any secure fastenings.

D is a pulley for giving motion to the sheller.

E is a pulley for driving the elevator or draper F, the lower extremity of which is placed at the inner side or delivery of the cylinder to receive the stalks, whence they are conveyed, over the roller G, out of the box.

H is the concave sheller, against which the grain and corn are rubbed in the process of thrashing or shelling. It is placed beneath the cylinder B, inclosing the same for about one-third or one-half of its periphery, and continued vertically, or nearly so, to the feed-place J.

This concave sheller rests on proper ledges in the box, and is placed about one inch or one inch and a half from the face of the ribs *a a* on the cylinder, so as to leave room for the corn between their respective surfaces, and also room for the insertion of the movable bars C when it is desired to shell the small grain.

This concave sheller is of iron, and is also reticulated, the bars being about half an inch distant from each other at the edges, which are presented toward the cylinder but swelling as they retire so as to give strength.

The reticulations of the bars C and of the concave sheller are made square in the drawing, but other forms will answer as well.

The arrows show the direction of the revolution of the cylinder.

J is the feeding-place, an opening formed by the conjunction of the surface of the cylinder and the extension of the concave sheller, and widening out to admit the unthrashed corn, wheat, or oats.

Having thus fully described my invention,

What I claim therein as new, and desire to secure by Letters Patent, is—

1. The combined grain-thrasher and corn-sheller herein described, and composed of cylinder B provided with ribs *a*, the removable reticulated bars C, and the concave reticulated plate H, substantially as and for the purpose set forth.

2. The removable reticulated bars C, in combination with the cylinder B and ribs *a*, substantially as and for the purpose set forth.

In testimony that I claim the foregoing combined thrasher and corn-sheller, I have hereunto set my hand this 31st day of March, A. D. 1870.

JOHN BOWMAN.

Witnesses:
E. THURLOW,
H. W. WELLS.